United States Patent
Busse et al.

(10) Patent No.: US 7,327,094 B2
(45) Date of Patent: Feb. 5, 2008

(54) CIRCUIT ARRANGEMENT AND METHOD FOR OPERATING AT LEAST ONE ELECTRIC LAMP

(75) Inventors: Olaf Busse, München (DE); Markus Heckmann, Guangzhou (CN); Reinhard Lecheler, Neuburg/Donau (DE); Alfons Lechner, Hohenwart (DE); Siegfried Mayer, Moosinning (DE); Thomas Pollischansky, München (DE); Bernd Rudolph, Forstern (DE); Bernhard Schemmel, Wessling (DE); Kay Schmidtmann, München (DE); Harald Schmitt, München (DE); Thomas Siegmund, Otterfing (DE); Arwed Storm, Dachau (DE); Horst Werni, München (DE)

(73) Assignee: Patent-Treuhand-Gesellschaft fur Elektrische Gluhlampen mbH, Munich (DE)

( * ) Notice: Subject to any disclaimer, the term of this patent is extended or adjusted under 35 U.S.C. 154(b) by 0 days.

(21) Appl. No.: 11/481,105

(22) Filed: Jul. 6, 2006

(65) Prior Publication Data
US 2007/0018592 A1   Jan. 25, 2007

(30) Foreign Application Priority Data
Jul. 7, 2005   (DE) ................. 20 2005 010 720 U

(51) Int. Cl.
*H05B 41/14* (2006.01)
*H05B 41/16* (2006.01)

(52) U.S. Cl. ...................................... 315/274; 315/276
(58) Field of Classification Search ............ 315/209 R, 315/246, 291, 307, 311, 276, 244, 224, DIG. 4, 315/DIG. 5, 268, 272, 273–274
See application file for complete search history.

(56) References Cited

U.S. PATENT DOCUMENTS

| | | | |
|---|---|---|---|
| 6,426,597 B2* | 7/2002 | Rast et al. ................. | 315/219 |
| 6,914,394 B2* | 7/2005 | Weirich ..................... | 315/291 |
| 7,154,230 B2* | 12/2006 | Peka ........................ | 315/209 R |
| 7,193,373 B2* | 3/2007 | Storm ....................... | 315/291 |
| 7,196,479 B2* | 3/2007 | Storm ....................... | 315/209 R |
| 2005/0083022 A1* | 4/2005 | Braun et al. ............... | 323/222 |

* cited by examiner

*Primary Examiner*—Shih-Chao Chen
*Assistant Examiner*—Minh Dieu A
(74) *Attorney, Agent, or Firm*—Carlo Bessone

(57) ABSTRACT

The present invention relates to a circuit arrangement for operating at least one electric lamp (LP) having a drive circuit (16), which has at least one terminal for a system voltage ($U_N$) on the input side and at least one terminal for the at least one electric lamp (LP) on the output side; the drive circuit (16) having a control unit (18) and a step-up converter having a step-up converter inductor (L2) and a switch (S1), and the control unit (18) being designed to operate the step-up converter in a discontinuous mode, in which the current ($I_N$) through the step-up converter inductor (L2) has gaps, the duration (▮ t) of these gaps being varied. It also relates to an operating method for at least one electric lamp (LP) using such a circuit arrangement.

13 Claims, 2 Drawing Sheets

CIRCUIT ARRANGEMENT AND METHOD FOR OPERATING AT LEAST ONE ELECTRIC LAMP

TECHNICAL FIELD

The present invention relates to a circuit arrangement for operating at least one electric lamp having a drive circuit, which has at least one terminal for a system voltage on the input side and at least one terminal for the at least one electric lamp on the output side, the drive circuit having a control unit and a step-up converter having a step-up converter inductor and a switch. It also relates to an operating method for at least one electric lamp using such a circuit arrangement.

PRIOR ART

In such circuit arrangements in which the step-up converter is used for system current harmonic correction (power factor correction=PFC), the step-up converter is generally operated in the so-called transition mode. In this case, transition mode is understood to mean an operating mode in which the switching operations of a switch in the step-up converter are carried out at times at which the current through the step-up converter inductor is equal to zero, i.e. the switch of the step-up converter is closed, in the case of a falling edge of the current through the step-up converter inductor, when the current through the step-up converter inductor reaches the value zero. If this step-up converter is operated using DC voltage, this means that the step-up converter operates at a fixed frequency and therefore the radio interference peaks at the operating frequency which is established and their harmonics are very narrow and very high, which entails a high degree of complexity in terms of radio interference suppression. In order to adhere to the predetermined radio interference limit values, the radio interference filters therefore need to have sufficiently large dimensions and/or the operating frequency needs to be selected to be so low that as many harmonics as possible are in the range up to 150 kHz, since in this range higher limit values apply in accordance with the relevant standard. A further possibility for adhering to the radio interference limit values consists in wobbling the operating frequency of the step-up converter, which would, however, lead to severe modulation of the current drawn from the system (high RMS values). In addition, the possible frequency modulation by means of wobbling is so low in comparison to the bandwidth of the radio interference measurement filters used in this case of the used radio interference measuring devices that only a slight improvement in the radio interference spectrum can be achieved. The conventional bandwidth of such radio interference measurement filters is 9 kHz at a transient response time of 1 s.

FIG. 1 shows the time profile of the current through the step-up converter inductor in the case of a known circuit arrangement, which is operated in the transition mode. The operating frequency is 105.0420 kHz, and the maximum amplitude of the current is 408 mA.

SUMMARY OF THE INVENTION

The object of the present invention therefore consists in developing a circuit arrangement mentioned at the outset or an operating method mentioned at the outset such that radio interference suppression is made possible with little complexity.

In principle, the invention is based on the concept of the complexity involved with radio interference suppression being low if the frequency spectrum is broadened using suitable measures. According to the invention, this takes place by the control unit being designed to operate the step-up converter in a discontinuous mode, in which the current through the step-up converter inductor has gaps, the duration of these gaps being varied. Discontinuous mode is understood to mean an operating mode in which, in contrast to the transition mode, the switch is not closed again as early as at the time at which the current through the step-up converter inductor reaches the value zero, but there is a wait until a certain period of time has elapsed, this period of time being varied. Even though the current does not continuously remain at the value zero between the time at which the value zero is reached and the time at which the switch of the step-up converter is closed again as a result of electrical reactions within the circuit arrangement, this period of time is nevertheless referred to as a "current gap", i.e. a currentless phase. By suitably selecting the duration of the gaps, it is possible to achieve a bandwidth for the operating frequency of the step-up converter which is far greater than the bandwidth of the radio interference measurement filter. Less radio interference therefore occurs in the window of the predetermined bandwidth and this therefore allows for lower interference levels which are therefore easier to suppress. The larger the gap the lower the lowest frequency of the resulting spectrum is. In contrast to the prior art, in which a virtually discrete radio interference spectrum has resulted, the radio interference spectrum of the invention has been extended to a considerable extent. Owing to the change in the duration of the gaps, in particular owing to the continuous change in the duration of the gaps, it is thus possible for the step-up converter to be operated over a wide frequency band. Owing to the measure according to the invention, it is possible to use higher operating frequencies, at which in principle it is more difficult to suppress the interference, and therefore smaller physical shapes for the step-up converter inductor can be used and, as a result, cost savings can be achieved.

Switchover from the transition mode to the discontinuous mode preferably takes place if the system voltage is a DC voltage.

In this respect, in one preferred embodiment, the control unit is designed to detect whether an AC voltage and/or a DC voltage is present at the terminal for the system voltage, the control unit furthermore being designed to operate the step-up converter in a transition mode when the presence of an AC voltage is detected and/or to operate the step-up converter in the discontinuous mode, with a variation of the gaps in the current when the presence of a DC voltage is detected. As regards radio interference, optimum operating modes of the step-up converter therefore result both in the case of operation from an AC source and in the case of operation from a DC source. In order to carry out this detection, in one preferred embodiment, the control unit is designed to detect a zero crossing of the signal at the terminal for the system voltage and to correspondingly evaluate it for the purpose of driving the step-up converter. For this purpose, a highly resistive voltage divider may be used, for example.

The duration of the gaps is preferably between 0.1 µs and 20 µs, further preferably between 1 µs and 5 µs. The duration of the gaps is preferably varied at a sweep frequency of between 0.1 Hz and 100 kHz, further preferably of between 1 Hz and 10 Hz. This is particularly advantageous since the transient response time of conventional radio interference measurement filters is approximately 1 s.

One particularly preferred embodiment is characterized by the fact that the step-up converter furthermore comprises a capacitance, it being possible for an intermediate circuit voltage to be provided at the capacitance as the output signal of the step-up converter, the control unit furthermore being designed to determine the switch-on time of the switch such that the intermediate circuit voltage is within predeterminable limits, in particular is constant. This preferred embodiment provides the advantage that, as a result, an increase in the ripple in the so-called intermediate circuit operated using the intermediate circuit voltage is reliably prevented.

Further advantageous embodiments are described in the dependent claims.

The preferred embodiments and advantages described above with respect to the circuit arrangement according to the invention also apply correspondingly to the operating method according to the invention.

BRIEF DESCRIPTION OF THE DRAWINGS

One exemplary embodiment of a circuit arrangement according to the invention will now be described in more detail below with reference to the attached drawings, in which.

PREFERRED EMBODIMENT OF THE INVENTION

Figure 2:
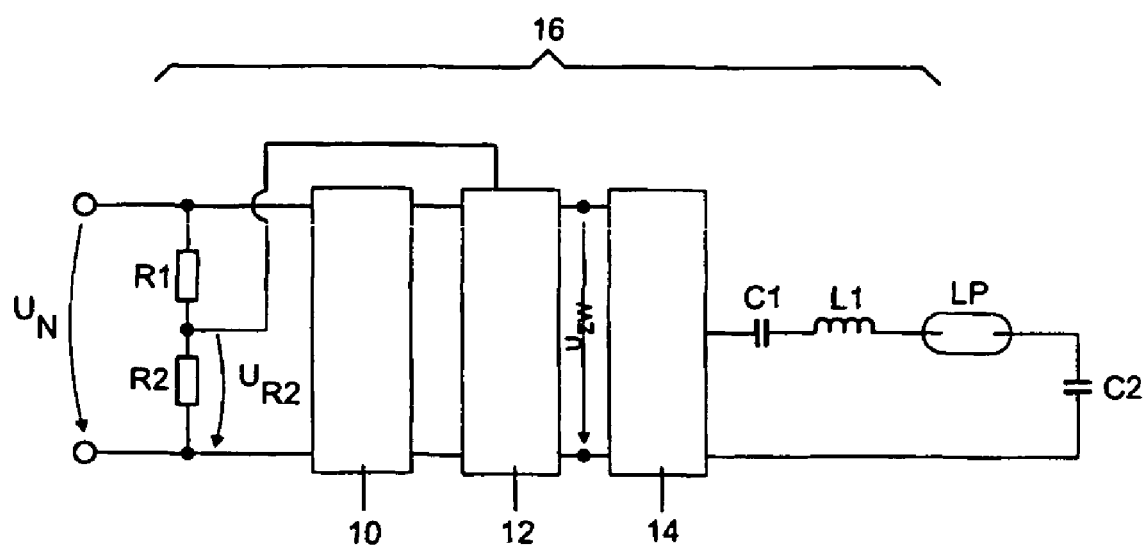
FIG. 2 shows a schematic illustration of the setup of a circuit arrangement according to the invention.

FIG. 2 shows a schematic illustration of an exemplary embodiment of a circuit arrangement according to the invention. In this case, a system voltage $U_N$, which may be an AC voltage or a DC voltage, for example from an emergency power supply, is coupled in a known manner to an load circuit via a rectifier 10, an apparatus for system current harmonic correction 12, which provides the so-called intermediate circuit voltage $U_{ZV}$ at its output, and an inverter 14, the load circuit in this exemplary embodiment comprising a coupling capacitor C1, an inductance L1, the electric lamp LP and a resonant capacitor C2. According to the invention, a voltage divider with resistors R1 and R2 is provided, the signal tapped off at the resistor R2 being fed to the apparatus for system current harmonic correction 12. The components, starting from the voltage divider R1, R2 to the inductance L1, form a drive circuit 16 for the lamp LP.

Figure 3:
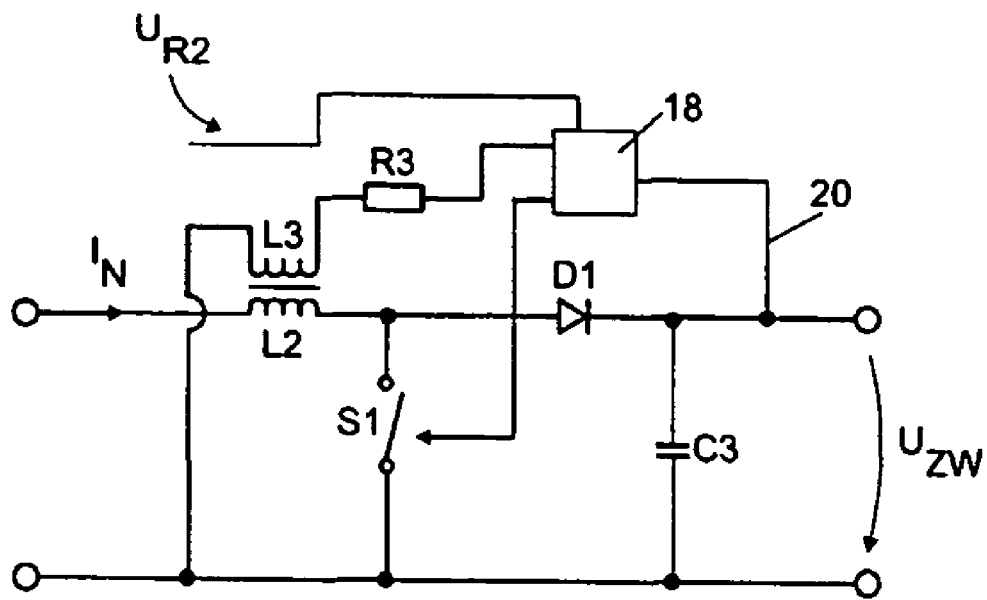
FIG. 3 shows a detailed illustration of a detail from FIG. 2.

A more detailed illustration of the apparatus for system current harmonic correction 12 can be seen in FIG. 3. It shows a step-up converter, which comprises a step-up converter inductor L2, a switch S1, a diode D1 and a capacitor C3. The apparatus for system current harmonic correction 12 furthermore comprises a control unit 18. This control unit 18 is fed the voltage drop $U_{R2}$ across the resistor R2. The control unit 18 tests whether the voltage $U_{R2}$ has a zero crossing or not. If it has a zero crossing, it switches to a "transition mode" operation. If the control unit 18 does not determine a zero crossing in the voltage $U_{R2}$, it switches to a "discontinuous mode" operation. In the transition mode, the switch S1 is immediately closed again in the event of the current $I_N$ through the step-up converter inductor L2 falling to zero, while, in the discontinuous mode, there is a wait until a certain duration $\Delta t$ has elapsed. This duration $\Delta t$ is referred to as a "gap in the current" and is varied according to the invention by the control unit 18. The time of a zero value for the current $I_N$ is determined by an additional winding L3 on the step-up converter inductor L2, whose signal is fed to the control unit 18 via a resistor R3. The control unit 18 is moreover fed the value of the voltage $U_{ZV}$ across the capacitor C3 via a line 20, the control unit 18 being designed to determine the switch-on time $t_{on}$ of the switch S1 such that the intermediate circuit voltage $U_{ZV}$ is as constant as possible. According to the invention, the duration of the gaps $\Delta t$ in the current $I_N$ through the step-up converter inductor L2 is varied between 0.1 µs and 20 µs. In this case, a sweep frequency is used which is between 0.1 Hz and 100 kHz.

Figure 1:
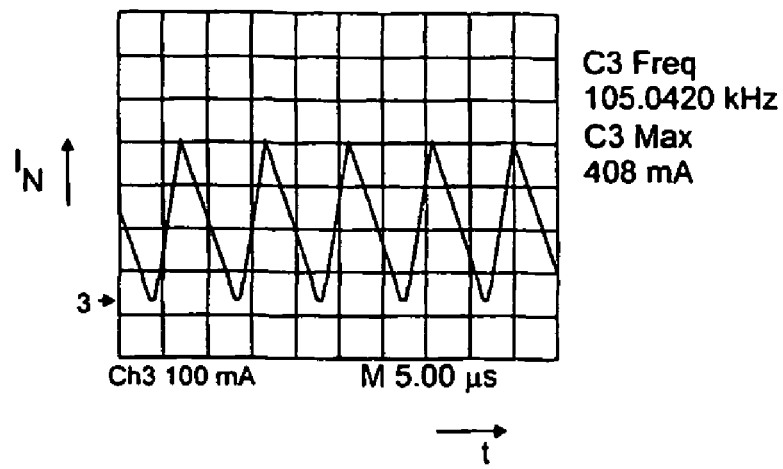
FIG. 1 shows the time profile of the current through the step-up converter inductor in a circuit arrangement known from the prior art during operation in the transition mode.
Figure 4:
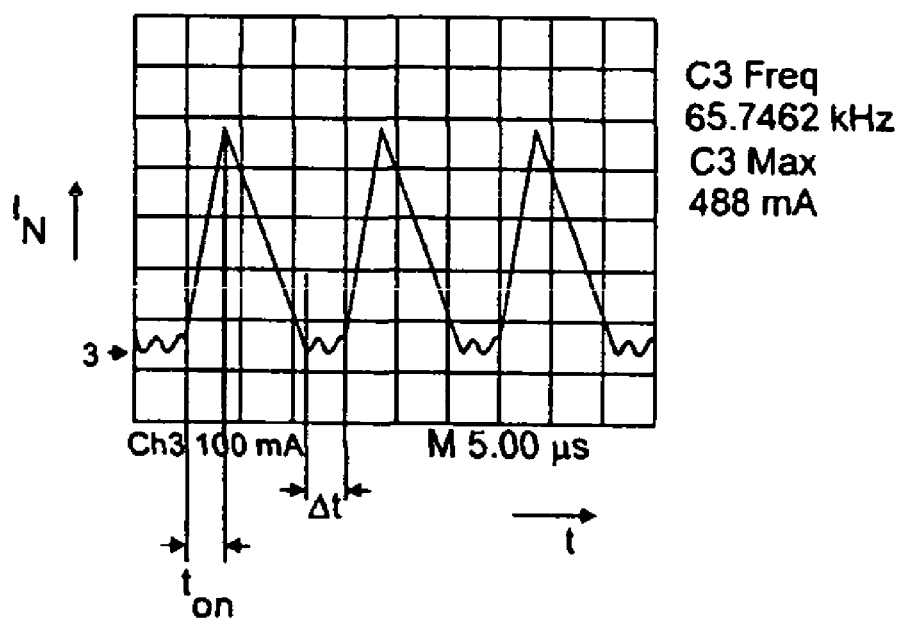
FIG. 4 shows the time profile of the current through the step-up converter inductor in a circuit arrangement according to the invention during operation in the discontinuous mode.

FIG. 4 shows the time profile of the current $I_N$ through the step-up converter inductor L2 in the case of a circuit arrangement according to the invention. It shows that once the value zero has been first reached, there is a wait for a duration $\Delta t$ until the switch S1 of the step-up converter is closed again, which results in a rising edge of the current $I_N$. In this case, the gap in the current $\Delta t$ is approximately 25% of the period duration. In comparison with FIG. 1 it can be seen that the operating frequency has been reduced to 65.7462 kHz, which corresponds to a frequency reduction of just 40%. In contrast to this, the peak current has only increased by approximately 20% to 488 mA.

The invention claimed is:

1. A circuit arrangement for operating at least one electric lamp (LP) having a drive circuit (16), which has at least one terminal for a system voltage ($U_N$) an the input side and at least one terminal for the at least one electric lamp (LP) on the output side;
    the drive circuit (16) having a control unit (18) and a step-up converter having a step-up converter inductor (L2) and a switch (S1);
    wherein the control unit (18) is designed to operate the step-up converter in a discontinuous mode, in which the current ($I_N$) through the step-up converter inductor (L2) has gaps, the duration ($\Delta t$) of these gaps being varied.

2. The circuit arrangement as claimed in claim 1, wherein the step-up converter is designed to bring about a system current harmonic correction (12).

3. The circuit arrangement as claimed in claim 1, wherein the control unit (18) is designed to detect whether an AC voltage and/or a DC voltage is present at the terminal for the system voltage ($U_N$). the control unit (18) furthermore being designed to operate the step-up converter in a transition mode when the presence of an AC voltage ($U_N$) is detected and/or to operate the step-up converter in the discontinuous mode, with a variation in the duration ($\Delta t$) of the gaps in the current when the presence of a DC voltage ($U_N$) is detected.

4. The circuit arrangement as claimed in claim 3,
    wherein the control unit (18) is designed to detect a zero crossing of the signal at the terminal for the system voltage ($U_N$) and to evaluate it for the purpose of driving the step-up converter.

5. The circuit arrangement as claimed in claim 1,
    wherein the duration of the gaps is between 0.1 µs and 20 µs, preferably between 1 µs and 5 µs.

6. The circuit arrangement as claimed in claim 1, wherein the duration (Δt) of the gaps is varied at a sweep frequency of between 0.1 Hz and 100 kHz, preferably of between 1 Hz and 10 Hz.

7. The circuit arrangement as claimed in claim 1, wherein the step-up converter furthermore comprises a capacitance (C3), it being possible for an intermediate circuit voltage ($U_{ZW}$) to be provided at the capacitance (C3) as the output signal of the step-up converter, the control unit (18) furthermore being designed to determine the switch-on time ($t_{on}$) of the switch (S1) such that the intermediate circuit voltage ($U_{ZW}$) is within predeteminable limits, in particular is constant.

8. The circuit arrangement as claimed in claim 2, wherein the control unit (18) is designed to detect whether an AC voltage and/or a DC voltage is present at the terminal for the system voltage ($U_N$), the control unit (18) furthermore being designed to operate the step-up converter in a transition mode when the presence of an AC voltage ($U_N$) is detected and/or to operate the step-up converter in the discontinuous mode, with a variation in the duration (Δt) of the gaps in the current when the presence of a DC voltage ($U_N$) is detected.

9. The circuit arrangement as claimed in claim 3, wherein the control unit (18) is designed to detect a zero crossing of the signal at the terminal for the system voltage ($U_N$) and to evaluate it for the purpose of driving the step-up converter.

10. The circuit arrangement as claimed in claim 2, wherein the duration of the gaps is between 0.1 μs and 20 μs preferably between 1 μs and 5 μs.

11. The circuit arrangement as claimed in claim 2, wherein the duration (Δt) of the gaps is varied at a sweep frequency of between 0.1 Hz and 100 kHz, preferably of between 1 Hz and 10 Hz.

12. The circuit arrangement as claimed in claim 2, wherein the step-up convener futhermore comprises a capacitance (C3), it being possible for an intermediate circuit voltage ($U_{ZW}$) to be provided at the capacitance (C3) as the output signal of the step-up converter, the control unit (18) furthermore being designed to determine the switch-on time ($t_{on}$) of the switch (S1) such that the intermediate circuit voltage ($U_{ZW}$) is within predeterminable limits, in particular is constant.

13. An operating method for at least one electric lamp (LP) using a circuit arrangement having a drive circuit (16), which has at least one terminal for a system voltage ($U_N$) on the input side and at least one terminal for the at least one electric lamp (LP) on the output side;

the drive circuit (16) having a control unit (18) and a step-up converter having a step-converter inductor (L2) and a switch (S1), wherein the control unit (18) operates the step-up converter in a discontinuous mode, in which the current ($I_N$) through the step-up converter inductor (L2) has gaps, the duration (Δt) of these gaps being varied.

* * * * *